United States Patent
Miller et al.

(10) Patent No.: US 8,687,504 B2
(45) Date of Patent: *Apr. 1, 2014

(54) SYSTEM AND METHOD FOR ENHANCEMENT OF ETHERNET LINK LOSS FORWARDING

(75) Inventors: Gary Michael Miller, Kearneysville, WV (US); David Owen Corp, Clifton, VA (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,272

(22) Filed: Jul. 27, 2012

(65) Prior Publication Data

US 2012/0294606 A1  Nov. 22, 2012

Related U.S. Application Data

(63) Continuation of application No. 12/551,344, filed on Aug. 31, 2009, now Pat. No. 8,248,954.

(51) Int. Cl.
 *H04J 3/14*  (2006.01)
(52) U.S. Cl.
 USPC ........... 370/242; 370/216; 370/221; 709/224; 714/704; 398/27
(58) Field of Classification Search
 USPC ......... 370/216–224, 241–251, 536, 466, 229, 370/225; 714/704–705; 709/224, 239
 See application file for complete search history.

(56) References Cited

U.S. PATENT DOCUMENTS

| | | |
|---|---|---|
| 5,781,535 A | 7/1998 | Russ et al. |
| 6,519,384 B2 | 2/2003 | Persson |
| 6,570,850 B1 | 5/2003 | Gutierrez et al. |
| 6,850,660 B2 | 2/2005 | Notani |
| 7,065,104 B1 | 6/2006 | Seren et al. |
| 7,092,630 B2 | 8/2006 | Cunningham et al. |
| 7,203,182 B2 | 4/2007 | Hwang |
| 7,242,677 B2 | 7/2007 | Hong |
| 7,391,720 B1 | 6/2008 | Kuditipudi et al. |

(Continued)

OTHER PUBLICATIONS

"Link-Loss-Learn on Magnum Managed Ethernet Switches . . . a Technical Brief", GarrettCom, Inc., Copyright 2005, web: , pp. 1-4.

(Continued)

*Primary Examiner* — Michael Thier
*Assistant Examiner* — Vincelas Louis
(74) *Attorney, Agent, or Firm* — Stacey J. Longanecker; Mark S. Bicks; Alfred N. Goodman

(57) ABSTRACT

A system and method provide enhanced link loss forwarding in an Ethernet system to determine link degradation and to selectively block and re-establish transport between a near end device and far end device based on a SONET connection between end devices and link status detection using local packets. When an excessive number of errors are detected in an Ethernet port, a device enters a Links Off mode from a Transport mode where Ethernet ports are turned off at both ends of a circuit associated with the errors. A Block Transport mode is then entered where local packets (e.g., OAM packets) are monitored to evaluate link quality (e.g., SONET bit error rate). Transport mode is re-established when acceptable link quality is achieved for a selected period of time.

12 Claims, 4 Drawing Sheets

(56) References Cited

U.S. PATENT DOCUMENTS

| | | | |
|---|---|---|---|
| 7,394,758 | B2 | 7/2008 | Gonda |
| 7,453,825 | B1 | 11/2008 | Sivasankaran et al. |
| 7,653,526 | B1 | 1/2010 | Ryle et al. |
| 7,962,806 | B2 * | 6/2011 | Kotrla et al. .................. 714/704 |
| 2003/0076857 | A1 | 4/2003 | Morita et al. |
| 2004/0062198 | A1 | 4/2004 | Pedersen et al. |
| 2004/0167978 | A1 | 8/2004 | Kitayama |
| 2007/0022331 | A1 | 1/2007 | Jamieson et al. |
| 2007/0255819 | A1 | 11/2007 | Hua et al. |
| 2008/0002569 | A1 | 1/2008 | Cole et al. |
| 2008/0089235 | A1 | 4/2008 | Kotrla et al. |
| 2008/0219172 | A1 | 9/2008 | Mohan et al. |
| 2008/0240047 | A1 | 10/2008 | Ozluturk et al. |
| 2009/0013210 | A1 | 1/2009 | McIntosh et al. |
| 2009/0052336 | A1 | 2/2009 | Nguyen et al. |
| 2009/0059800 | A1 | 3/2009 | Mohan |
| 2010/0027415 | A1 * | 2/2010 | So et al. ........................ 370/225 |
| 2010/0067372 | A1 | 3/2010 | Diab |
| 2010/0095167 | A1 * | 4/2010 | Kotrla et al. .................. 714/705 |
| 2010/0135162 | A1 | 6/2010 | Takase et al. |
| 2010/0246409 | A1 | 9/2010 | Kotrla et al. |
| 2011/0051598 | A1 * | 3/2011 | Oldershaw et al. ........... 370/221 |
| 2011/0058487 | A1 * | 3/2011 | Kotrla et al. .................. 370/242 |
| 2011/0149747 | A1 | 6/2011 | Kotrla et al. |

OTHER PUBLICATIONS

Pulsecom, "OC-48 to Gigabit Ethernet Multiplexer G2 Family", Practice Section 1591, Issue 2, Feb. 2007, Copyright 2007, Pulse Communications Inc., pp. 1-28.

* cited by examiner

SYSTEM AND METHOD FOR ENHANCEMENT OF ETHERNET LINK LOSS FORWARDING

This application is a continuation of U.S. patent application Ser. No. 12/551,344, filed Aug. 31, 2009 now U.S. Pat. No. 8,248,954, the entire contents of which are incorporated by reference herein.

FIELD OF THE INVENTION

The present application relates generally to network communication diagnostics and, more particularly, Link Loss Forwarding (LLF) in an Ethernet network.

BACKGROUND OF THE INVENTION

Traditional digital networks have been developed to transfer information such as data among digital computer systems and other digital devices. A variety of types of networks, such as Ethernet, have been developed and implemented using diverse information transfer methodologies. These traditional networks utilize communication ports connected to one another via links in a communication network to send and receive data. However, when one of these links degrades (e.g. the near end transmitting path), the corresponding far end port (e.g. far end receiving port) may continue to receive some data via the corresponding media (e.g., fiber). Accordingly, devices connected to the degraded link operate under a false perception that the link is operating properly. By the time the error is diagnosed, however, substantial data loss may occur.

Link Loss Forwarding (LLF) exists (e.g. is used in existing Ethernet media converters) that disables a far end signal when a loss of input signal at an end of a circuit occurs. In other words, loss of a valid signal or loss of link is forwarded to the far end. For example, intermediate transport failure such as SONET can cause the link to be dropped. LLF is used to signal a line failure in systems that may not be able to respond to a dropped communication path quickly. After disabling the far end, the system may switch to an alternative path, or a network administrator may then be informed of the disconnection immediately and react as promptly as possible to the situation, in an attempt to minimize losses.

This LLF technique, however fails to provide adequate tools for determining link degradation or resolution measures for suspected link degradation. For example, if traffic is being carried over aggregated transport (e.g., multiple lines) using Link Access Control Protocol (LACP), one low quality line can result in sufficient retransmission requests to overwhelm the remaining good transport. In other words, the system would be better served if the poor quality line were shut down.

Current systems lack the ability to determine link degradation that may lead to link failure. Thus, a need exists for enhanced LLF that automatically and proactively determines link degradation. Further, a need exists for enhanced LLF that provides options following a determination of link degradation such as instituting at least a temporary block transport mode and restoring links when a link that indicated excessive errors is working adequately (e.g., at a selected minimal error rate) for a selected period of time.

SUMMARY OF THE INVENTION

Exemplary embodiments of the present invention address at least the above problems and/or disadvantages, and provide at least the advantages described below.

An illustrative method according to exemplary embodiments of the present invention provides for communicating data in a communication transport system having a communication network, communicating at least one of data packets and local packets between the near end device and the far end device via said communication network; determining a poor quality of said communication network; selecting a links off mode of both the near end device and the far end device to disconnect the near and far end devices from the communication network in response to determining said poor quality of said communication network; operating the near and far end devices in said links off mode for a selected time period; selecting a block transport mode of the near end device and the far end device in response to said selected time period expiring to communicate local packets while inhibiting communication of data packets; determining at least one of a link status, a signal level, and a lack of local packet corruption while operating in said block transport mode; and determining the communication network has been successfully restored based on the at least one of the link status, the signal level, and the lack of local packet corruption.

Another aspect of the exemplary embodiments of the present invention provides for determining whether the number of successfully communicated local packets is communicated over a selected diagnosis time period.

Still another aspect of the exemplary embodiment of the present invention provides for selecting a transport mode of the near end device and the far end device for communicating the data packets and the local packets between the near end device and the far end device in response to the number of successfully communicated local packets being communicated within the selected diagnosis time period.

Yet another aspect of the exemplary embodiment of the present invention provides for detecting at least one corrupted packet communicated between the near end device and the far end device and detecting a transmission signal level of the communication network.

Another aspect of the exemplary embodiment of the present invention provides for monitoring a timer to determine the selected diagnosis period.

Yet another aspect of the exemplary embodiment of the present invention provides the selected diagnosis time period being 10 seconds.

Still another aspect of the exemplary embodiments of the present invention provides for resetting the timer when detecting the at least one corrupt packet within the selected diagnosis time period.

Finally, another aspect of the exemplary embodiments of the present invention provides for the poor quality of communication network being based on at least one of a selected percentage of corrupted packets received by at least one of the near end device and the far end device, and a selected transmission signal level of the communication network.

BRIEF DESCRIPTION OF THE DRAWINGS

The above and other exemplary features, aspects and advantages of the present invention will become more apparent from the following detailed description of certain exemplary embodiments thereof when taken in conjunction with the accompanying drawings in which.

DETAILED DESCRIPTION OF EXEMPLARY EMBODIMENTS

Figure 1A:
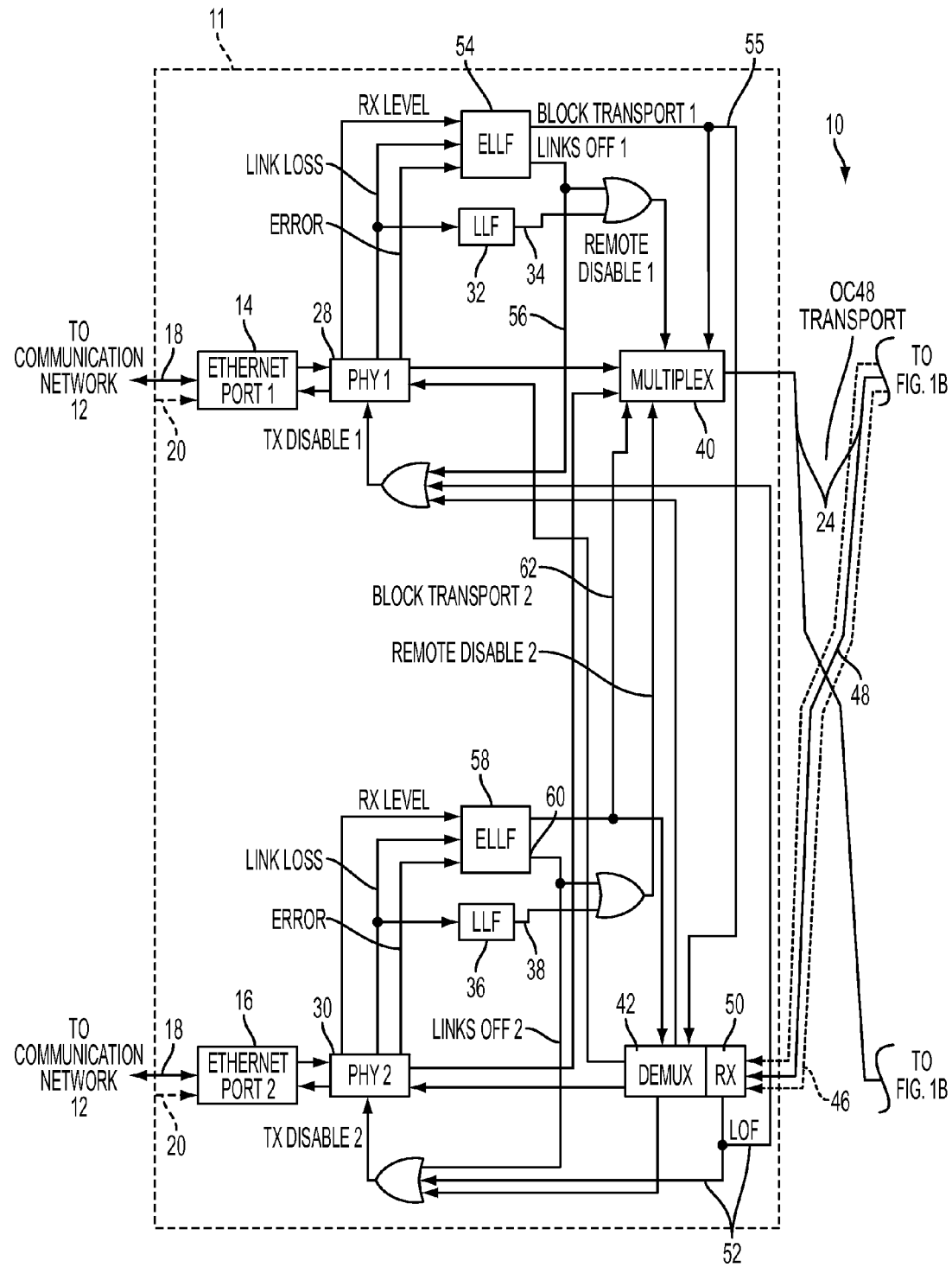
FIG. 1 is a schematic block diagram of a communication transport system including Enhanced Link Loss Forwarding according to exemplary embodiments of the present invention.
Figure 1B:
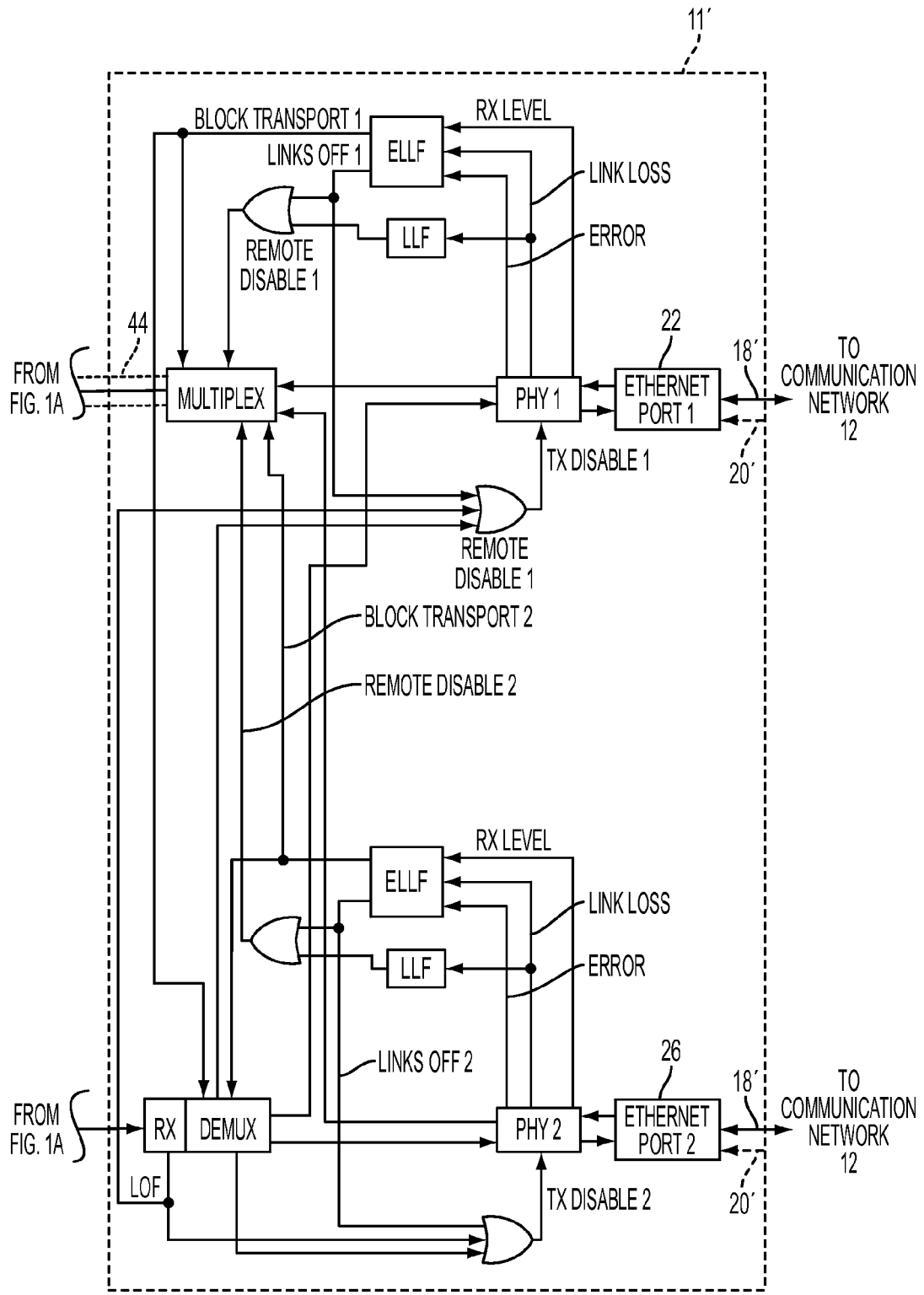

Referring to the Figures, wherein like numerals indicate corresponding parts throughout the several views, FIG. 1 generally shows a communication transport system 10 including a near end device 11 and a far end device 11', each being capable of transporting data bi-directionally and having a synchronous communication network 24 (e.g., OC-48 transport) therebetween. In the illustrative embodiment of the present invention depicted in FIG. 1, the far end device 11' is depicted as comprising similar components as the above-described near end device 11. However, the near end and far end devices 11, 11' need not be identical. In addition, although the description of the exemplary embodiment shown in FIG. 1 may describe data flow being transported from the near end device 11 to the far end device 11', it can be appreciated that data flow may also be transported in an opposite direction i.e., from the far end device 11' to the near end device 11.

Each of the near end device 11 and the far end device 11' are connected to a communication network 12 for transporting data bi-directionally. The near end device 11 includes a first near end communication port 14 and a second near end communication port 16. The first near end communication port 14 electrically and/or optically communicates with the communication network 12 to receive at least one near end data packet 18 and near end local packet 20 and transmits the near end data packet 18 and near end local packet 20 to a first far end communication port 22 via a data transport network 24. Furthermore, each communication port 14, 16, 22 and 26 is selectively operable in a first near end enable mode for transmitting and receiving data and a first near end disable mode for being disconnected from the communication network 12.

The second near end communication port 16 electrically and/or optically communicates with the communication network 12 to receive at least one near end data packet 18' and near end local packet 20' and transmits the near end data packet 18' and near end local packet 20' to a second far end communication port 26 via the data transport network 24. As mentioned above, the second near end communication port 16 is selectively operable in a second near end enable mode for transmitting and receiving data and a second near end disable mode for being disconnected from the communication network 12. Further, although FIG. 1 shows two communication ports included with each near end device 11 and far end device 11', it can be appreciated that less or additional communication ports 14, 16, 22, 26 may be included.

The communication transport system 10 further includes a first near end physical interface (PHY) module 28 and a second near end physical interface (PHY) module 30. The first near end physical interface module 28 has a first PHY input and a first PHY output. The first PHY input is in electrical communication with the first near end communication port 14 for selecting at least one of the enable mode and the disable mode. Similarly, the second near end PHY module 30 has a second PHY input and a second PHY output. The second PHY output is in electrical communication with the second near end communication port 16 for selecting at least one of the enable mode and the disable mode.

A first link loss forward (LLF) module 32 is in electrical communication with the first near end PHY module 28 for determining whether the first near end communication port 14 is disconnected from the communication network 12. If the first LLF module 32 detects that the first near end communication port 14 is disconnected from the communication network 12, the first LLF module 32 generates a first LLF error signal 34. The communication transport system 10 may include a similar second LLF module 36 in electrical communication with the second near end PHY module 30 for determining whether the second near end communication port 16 is disconnected from the communication network 12. Upon determining a disconnection, the second LLF module 36 generates a second LLF error signal 38.

The communication transport system 10 further includes a multiplexer 40 and demultiplexer 42 for multiplexing and demultiplexing data, respectively. The multiplexer 40 is in electrical communication with the first near end PHY module 28 and the second near end PHY module 30 and the data transport network 24. The multiplexer 40 delivers data packets 18 from the first near end PHY module 28 to a first far end PHY module 22 and delivers data packets 18 from the second near end PHY module 30 to a second far end PHY module 26. Moreover, the multiplexer 40 is selectively operable in a mux transport mode for delivering both of the data packets 18 and the local packets 20 and a mux block transport mode for inhibiting delivery of the data packets 18 while receiving and/or communicating the local packets 20.

The demultiplexer 42 is in electrical communication with the first near end PHY module 28 and the second near end PHY module 30 for delivering the data packets 18 and the local packets 20 to the first near end communication port 14 via the first near end PHY module 28. In addition, the demultiplexer 42 delivers the data packets 18 and the local packets 20 to the second near end communication port 16 via the second near end PHY module 30. Similar to the multiplexer 40, the demultiplexer 42 is selectively operable in a demux transport mode for receiving both of the data packets 18 and the local packets 20 and a demux block transport mode for inhibiting reception of the data packets 18 while receiving and/or communicating the local packets 20. Further, the demultiplexer 42 may be in electrical communication with the data transport network 24 for receiving at least one of a far end block transport signal 44, a far end remote disable signal 46 and a far end link loss forward (LLF) signal 48. The far end LLF signal, in particular is delivered by demultiplexer 42 to the first near end PHY module 28 for selecting the first near end disable mode and to the second near end PHY module 30 for selecting the second near end disable mode.

A receiver 50 may further be included in the near end device 11. The receiver 50 is electrical communication with the demultiplexer 42 and the data transport network 24 for receiving at least one of the far end LLF signal 48 and the far end block transport signal 44 and for detecting a loss of frame (LOF) on the data transport network 24 and for generating a loss of frame (LOF) signal 52 in response to detecting a missing signal input at the receiver 50. The first near end PHY module 28 and the second near end PHY module 30 may be in electrical communication with the receiver 50 for selecting the first near disable mode and the second near end disable mode, respectively, in response to receiving the LOF signal 52.

The near end device 11 features a first enhanced link loss forward module (ELLF) 54 having a first ELLF input in electrical communication with the first PHY output for determining an error on the communication network 12. The error on the communication network 12 is based on at least one of a percentage of corrupted packets received by at least one of the first near end communication port 14 and the second near end communication port 16 and a transmission signal level of the communication network 12.

The first ELLF module 54 has a first ELLF output in electrical communication with the first PHY input of the first near end PHY 28 for generating a first links off signal 56. The first links off signal 56 initiates the first near end disable mode of the first near end communication port 14. Further, the first links off signal 56 is multiplexed by the multiplexer 40 and is sent over the data transport network 24 to disable the first far end communication port 22. In response to receiving the first links off signal 56, both the first near end communication port 14 and the first far end communication port 22 are disconnected from the communication network 12 for a selected time period in response to determining the error on the communication network 12.

The first ELLF module 54 is in further electrical communication with the multiplexer 40 and the demultiplexer 42 for generating a first block transport signal 55 to select the mux block transport mode and the demux block transport mode in response to the selected time period expiring. In addition, the first ELLF module 54 may be in electrical communication with the first LLF module 32 and the multiplexer 40 for detecting a first near end link disconnection between the first near end communication port 14 and the first near end PHY module 28. In response to detecting the first near end link disconnection, the first ELLF module 54 generates the first links off signal 56 to disable the first near end communication port 14 and the first far end communication port 22. The error on the communication network 12 is based on at least one of a percentage of corrupted packets 18, 20 received by at least one of the first near end communication port 14 and the second near end communication port 16 and a transmission signal level of the communication network 12.

A similar second ELLF module 58 is in electrical communication with the second near end PHY module 30 for determining an error on the communication network 12. In response to determining an error, the second ELLF module 58 generates a second links off signal 60 that disables the second near end communication port 16 and the second far end communication port 26 for a selected time period. As noted above, the error on the communication network 12 is based on at least one of a percentage of corrupted packets 18, 20 received by at least one of the first near end communication port 14 and the second near end communication port 16 and a transmission signal level of the communication network 12.

As with the first ELLF module 54, the second ELLF module 58 is in electrical communication with the multiplexer 40 and the demultiplexer 42 for generating a second block transport signal 62. The second block transport signal 62 selects the mux block transport mode and the demux block transport mode in response to the selected time period expiring. The second ELLF module 58 may be in electrical communication with the second LLF module 36 and the multiplexer 40 for detecting a second near end link disconnection between the second near end communication port 16 and the second near end PHY module 30 and for generating the second links off signal 60 to disable the second near end communication port 16 and the second far end communication port 26 in response to detecting the second near end link disconnection.

In the illustrative embodiment of the present invention depicted in FIG. 1, the far end device 11' is depicted as comprising similar components as the above-described near end device 11. As stated previously, the near end and far end devices 11, 11' need not be identical.

Figure 2:
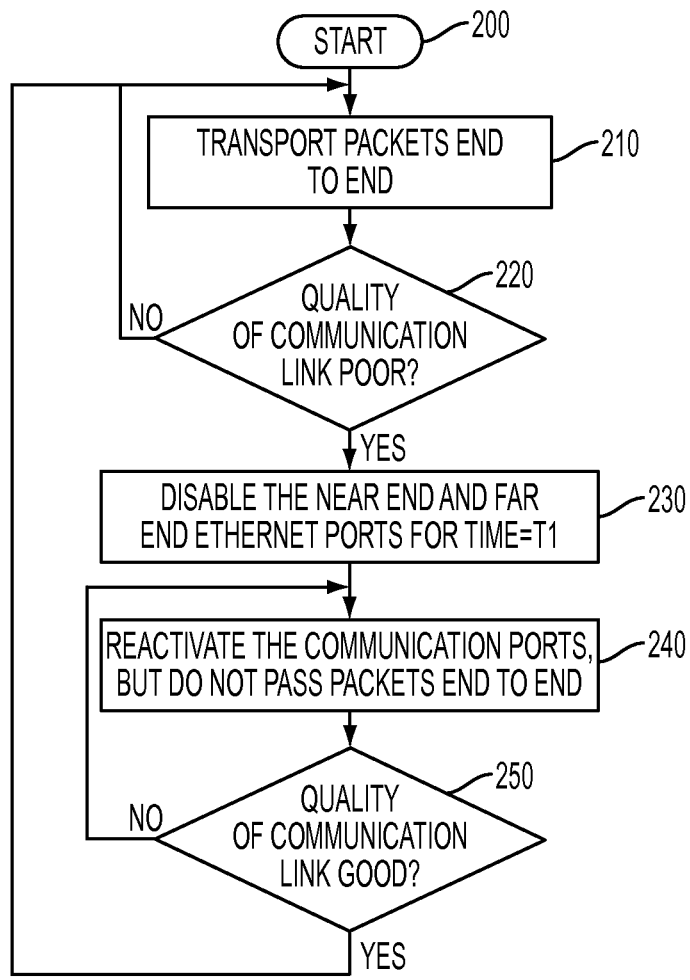
FIG. 2 is a flow diagram of an illustrative method for communicating data in a communication transport system according to exemplary embodiments of the present invention.

FIG. 2 is a flow diagram of a method for communicating data using devices in a communication transport system 10 having a communication network 12 connected to a near end device 11 and a far end device 11' according to an exemplary embodiment of present invention. The method starts at step 200. The near end device 11 and the far end device 11' initially operate in a transport mode for communicating data packets and local packets are communicated between one another end to end via a transport network 24 in step 210. A quality of the received data is determined in step 220. If the received data is determined to be corrupt, the method proceeds to step 230. Otherwise, the method returns to step 200. In step 230, both a near end device 11 and a far end device 11' are disabled and are disconnected from the communication network 12 for a selected period of time. In step 240, the near end ports 14 and/or 16 and the far end ports 22 and/or 26 are reactivated, but packets (e.g., customer packets) are not passed end to end. For example, only local packets are accepted by the ports. The method determines whether the ports 14, 16, 22, 26 included with the communication network 12 are of good quality in step 250, based on the local packets which can be maintenance packets, for example. It can be appreciated that other types of packets may be received or accepted at the ports in order to determine the quality of the ports 14, 16, 22, 26. If the received packets remain corrupted or continue to indicate poor link quality, the method returns to step 240. Otherwise, the near end device 11 and far end device 11' communicate both data packets and local packets and the method returns to step 210 such that the method runs continuously.

Figure 3:
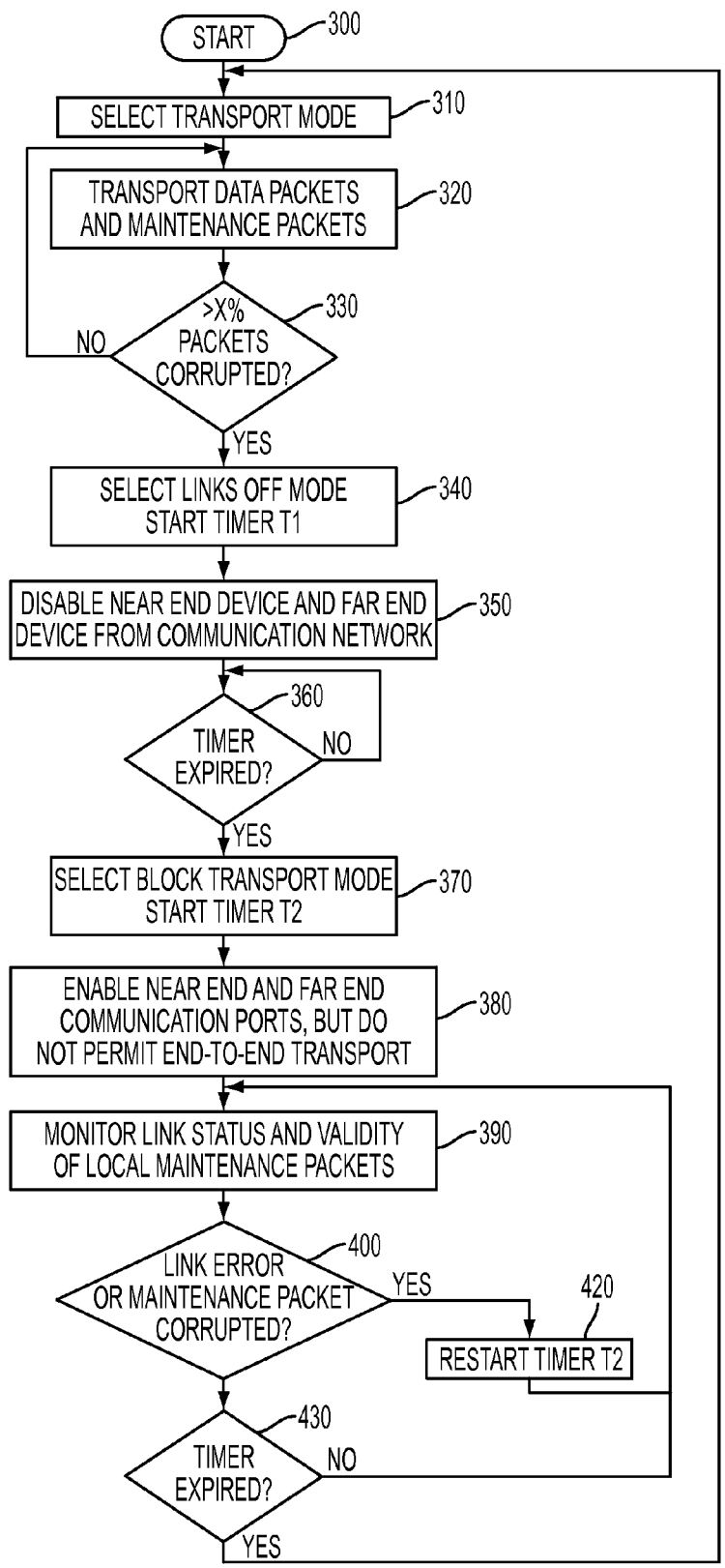
FIG. 3 is a flow diagram of an illustrative method for communicating data in a communication transport system according to exemplary embodiments of the present invention.

FIG. 3 is an illustrative system and method for providing enhanced LLF in accordance with an exemplary embodiment of the present invention using, by way of an example, the communication transport system 10 in FIG. 1 comprising a communication network 12 connected a near end device 11 and a far end device 11'. The method starts at step 300. A transport mode is selected in step 310 for initializing a transport mode of a near end device 11 and a far end device 11'. In step 320, the near end device 11 and the far end device 11' communicate data packets and local packets between one another via a transport network 24 in step 310. In step 330, the method determines whether data packets are corrupted. For exemplary purposes, the quality of the communication network is based on a percentage of corrupted packets; however, the quality of the communication network 12 may be determined based on detecting at least one corrupted packet received by at least one of the near end device 11 and the far end device 11', a transmission signal level of said communication network 12, or an attenuated signal level at the first PHY input and/or second PHY input, among other methods.

If a percentage of corrupted data packets does not exceed a selected threshold value (hereinafter X %), the method returns to step 320. When a percentage of corrupted data packets exceeds X %, a links off mode of both the near end device 11 and the far end device 11' is selected in step 340. In response to selecting the links off mode, the Ethernet ports of both the near end device 11 and the far end device 11' are disabled and are disconnected from the communication network 12 in step 350. Each port will remain disabled for duration T1. This time ensures that other devices connected to the communication network 12 will recognize that the port is disabled. When the selected period of time T1 expires in step 360, the near and far end devices 11, 11' initiate the block transport mode and timer T2 is initiated in step 370. In response to initiating the block transport mode, the near and far end Ethernet ports 14 and 22 and/or 16 and 26 are enabled in step 380; however, the near and far end devices 11, 11' are only partially operational. Specifically, local packets intended for local use are accepted, but data packets such as customer packets are not carried across the transport network 24. The local packets may include, but are not limited to Operations, Administration and Local (OAM) packets, maintenance packets, and control information, such as Link Access Control Protocol (LACP).

With reference to 400, 420 and 430, if an error is detected at any of the communication ports 14, 16, 22, 26 during the time T2, the timer is reset. Preferably only if there are no packet errors (e.g., or minimal number of packet errors accepted as lack of packet corruption) and minimal or no link status errors during the contiguous time T2 will the device exit 430 back to 310 where normal transport is resumed; otherwise, the link remains disabled until corrective action is taken (e.g., a cable is repaired or a fiber connection is cleaned). For example, an error free second is determined when, during each second of the diagnosis time period, at least one error free packet is received. Once a selected number (e.g., ten) of error free seconds are detected, the transport mode can be reinstated, resulting in the near and far end ports communicating normally (e.g., transporting customer packets). The enhanced LLF described herein in accordance with exemplary embodiments of the present invention is advantageous because it allows degraded links to be identified or located and proactive measures to be taken (e.g., restorative measures such as repairing a degraded cable or cleaning a degraded fiber connection) before the degradation becomes a link failure with associated link losses.

The enhanced LLF described herein in accordance with exemplary embodiments of the present invention is also advantageous because it can be compatible with older equipment. For example, the demux block transport mode can be omitted if the near end and far end devices 11 and 11' are both updated to have the enhanced LLF described herein at the same time. By adding the inhibiting of the demux operation, however, the enhanced LLF described herein in accordance with exemplary embodiments of the present invention can be implemented by upgrading only one end (e.g., only one of the near end device or far end device). In such a compatibility mode, the links off state or mode generates the same message as LLF, for example.

Exemplary embodiments of the present invention can also comprise computer readable codes on a computer readable medium. The computer readable medium can comprise any data storage device that can store data that can be read by a computer system. Examples of a computer readable medium include magnetic storage media (such as, ROM, floppy disks, hard disks, among others), optical recording media (such as, CD-ROMs, or DVDs), and storage mechanisms. It is also envisioned that remote storage or access via the Internet can be utilized as an equivalent to a computer readable medium. The computer readable medium can also be distributed over network coupled computer systems so that the computer readable code is stored and executed in a distributed fashion. Also, functional programs, codes, and code segments for accomplishing exemplary embodiments of the present invention can be construed by programmers of ordinary skill in the art to which the present invention pertains.

While various embodiments and features of the invention have been disclosed herein, it will be understood by those skilled in the art that various changes and modifications can be made without departing from the scope and spirit of invention as defined in the appended claims.

What is claimed is:

1. A method for communicating data in an Ethernet network including a communication network connecting a near end device and a far end device, the method comprising:
   communicating at least one of data packets and local packets between the near end device and the far end device via said communication network;
   determining a poor quality of said communication network by the near end device using a detected signal level associated with said communication network;
   selecting a links off mode of the near end device to disconnect the near end device from said communication network in response to determining said poor quality of said communication network, the far end device detecting a loss of link in response to disconnection of the near end device; and
   operating the near end device in said links off mode for a selected time period;
   wherein said communication network comprises an optical transport network, and the determining of poor quality of said communication network comprises determining a synchronous optical network (SONET) bit error rate.

2. The method as set forth in claim 1, further comprising:
   selecting a block transport mode of the near end device and the far end device in response to said selected time period expiring to communicate local packets while inhibiting communication of data packets;
   determining at least one of a link status, a signal level, and a lack of local packet corruption while operating in said block transport mode; and
   determining the communication network has been successfully restored based on the at least one of the link status, the signal level, and the lack of local packet corruption.

3. The method as set forth in claim 2, further comprising determining whether said number of successfully communicated local packets is contiguously communicated over a selected diagnosis time period.

4. The method as set forth in claim 3, further comprising selecting a transport mode of the near end device and the far end device for communicating said data packets and said local packets between the near end device and the far end device in response to said number of successfully communicated local packets being communicated within said selected diagnosis time period.

5. The method as set forth in claim 3, further comprising monitoring a timer to determine said selected diagnosis time period.

6. The method as set forth in claim 5, wherein said selected diagnosis time period is 10 seconds.

7. The method as set forth in claim 5, further comprising resetting said timer when detecting said at least one corrupted packet within said selected diagnosis time period.

8. The method as set forth in claim 2, further comprising detecting at least one corrupted packet communicated between the near end device and the far end device and detecting a transmission signal level of said communication network.

9. The method as set forth in claim 1, wherein said poor quality of said communication network is based on at least one of a percentage of corrupted packets communicated between the near end device and the far end device and a selected transmission signal level of said communication network.

10. The method as set forth in claim 1, further comprising terminating the links off mode by restoring connection of the near end device to the communication network when a new signal level associated with said communication network is determined by the near end device to be above a selected threshold.

11. The method as set forth in claim 1, wherein each of the near end device and the far end device has at least one Ethernet port and an interface to the communication network.

12. The method as set forth in claim 11, wherein the at least one Ethernet port at the near end device and the far end device is turned off when the SONET bit error rate exceeds a designated threshold.

* * * * *